C. E. BARNES.
Car-Axle.

No. 223,095.　　　　Patented Dec. 30, 1879.

Witnesses.
Louis A. Curtis
H. E. Lodge

Inventor.
Chas. E. Barnes.
F. Curtis, Atty

UNITED STATES PATENT OFFICE.

CHARLES E. BARNES, OF BOSTON, MASSACHUSETTS.

IMPROVEMENT IN CAR-AXLES.

Specification forming part of Letters Patent No. 223,095, dated December 30, 1879; application filed November 28, 1879.

*To all whom it may concern:*

Be it known that I, CHARLES E. BARNES, of Boston, county of Suffolk, and State of Massachusetts, have invented certain Improvements in Railway-Car Axles, of which the following is a specification.

This invention relates to means for enabling the wheels of railway-car trucks to adapt themselves to curves in the track by permitting one to turn independently of the other. To accomplish this result I use a divided axle the inner ends of which are formed with circumferential grooves and ribs, and are inclosed in a correspondingly ribbed and grooved box; and to obtain sufficient bearing-surface, and to avoid weakening the axle-sections, I form the grooves therein in such manner as to diminish in depth from the center toward the ends of the divided axle. I also make use of a soft-metal lining in the box, in order to obtain more perfect bearing for the axle and to reduce friction.

Figure 1:
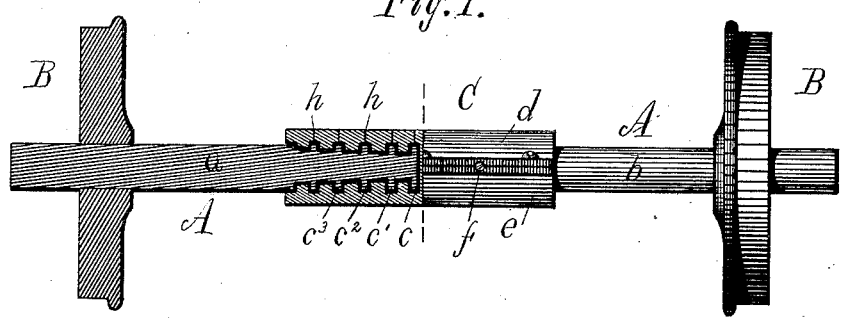
Figure 2:
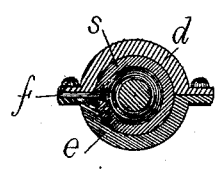
Figure 3:
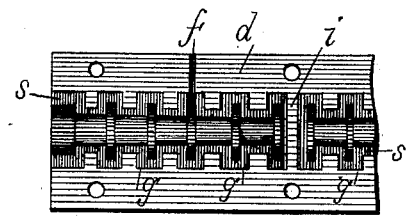

The drawings accompanying this specification represent, in Figure 1, a longitudinal sectional elevation, and in Fig. 2 a cross-section, of a railway-car axle and wheels containing my invention, while Fig. 3 is an inside view of one of the box-plates.

In said drawings, A represents the axle, and B B the wheels, of a railway-car truck, the latter being secured to and turning with the former.

In carrying my invention into practice I divide the axle centrally, or practically so, into two parts, $a$ and $b$, and I turn in the inner ends of each part several circumferential annular grooves, $c\ c'\ c^2$, &c., these grooves preferably decreasing in depth from the innermost one, $c$, outward, in order that a sufficient bearing-surface may be obtained between the axles and the inclosing-box to withstand the thrusts and strains upon the parts, and to avoid weakening the axle, which it will be seen I accomplish, as the grooves nearly or quite vanish into the circumference of the axle as they recede from the center, thus leaving the diameter of such axle intact toward or at the outer ends of the box.

The box which incloses and confines the inner ends of the axle is shown at C as composed of two parts or halves, $d\ e$, confined securely together by bolts, and provided with suitable oil-holes $f$, through which the parts may be lubricated, and when such lubrication is necessary the box is to be turned by hand until the oil-holes are uppermost, when the oil may be readily introduced.

To reduce friction and wear upon the inner ends of the axle I employ Babbitt or anti-friction metal, and to introduce it I cast in each half of the box a series of semi-annular grooves, $g\ g$, of larger diameter and width than those of the axles, and fill the intervening spaces with the soft metal, as shown by a heavy black line in Fig. 1, and at $s$ in Figs. 2 and 3, of the drawings, by means of holes $h\ h$ in one half of the box. By means of the intermediate soft-metal packing I obtain a perfect bearing about the axle and reduce friction.

My invention is equally applicable to old and new axles. When applied to old axles (in which case the axle would necessarily be shortened in cutting it in the center) the box should be cast with a central shelf or partition, $i$, which, in conjunction with the soft metal, shall compensate for the metal cut from the axle.

In fact, in applying my invention to new axles it may be desirable to separate the ends of the axle by the partition last named.

When running upon a straight track the wheels, if of uniform size, revolve at equal rates of speed, the box C rotates by and with the axle, and no wear comes upon the parts, as the friction between the box and the inner ends of the axle is considerably greater than upon the outer journals of the axle.

When describing a curvature in the track, one wheel tends to rotate faster than the other, and hence must slip upon the rail, and the friction thus caused overcomes the friction between the box C, and the opposite end of the axle rotates in the box to an extent equal to the difference in rotation of the two wheels.

It will thus be seen that the inner ends of the axle rotate within the box-axle at short intervals of time; hence the wear would be very slight.

The box cannot become loosened or separated, and the device is extremely simple and strong in construction.

I claim—

1. The axle in two parts and connected by the central box, in combination with suitable interlocking ribs and grooves upon the two, said ribs and grooves diminishing in depth from the center of the axle, substantially as herein described.

2. The combination of the parts, as herein explained, consisting of the axle in two portions, and containing circumferential grooves and ribs diminishing in depth, as described, the correspondingly ribbed and grooved box in two or more parts, inclosing the inner ends of the axle-sections, and provided with an anti-friction or soft-metal packing which lines its ribs and grooves on all sides, as set forth.

3. The channels or grooves in the axle and box, as diminishing in depth from the center of the axle outward, substantially as described.

CHAS. E. BARNES.

Witnesses:
F. CURTIS,
H. E. LODGE.